US008704680B1

(12) United States Patent
Zhang

(10) Patent No.: US 8,704,680 B1

(45) Date of Patent: Apr. 22, 2014

(54) LARGE-AREA PARKING-MONITORING SYSTEM

(71) Applicants: HangZhou HaiCun Information Technology Co., Ltd., HangZhou (CN); Guobiao Zhang, Corvallis, OR (US)

(72) Inventor: Guobiao Zhang, Corvallis, OR (US)

(73) Assignees: HangZhou HaiCun Information Technology Co., Ltd., HangZhou, ZheJiang (CN); Guobiao Zhang, Corvallis, OR (US)

( * ) Notice: Subject to any disclaimer, the term of this patent is extended or adjusted under 35 U.S.C. 154(b) by 0 days.

(21) Appl. No.: 13/951,467

(22) Filed: Jul. 26, 2013

Related U.S. Application Data

(60) Provisional application No. 61/758,752, filed on Jan. 30, 2013.

(51) Int. Cl.
*B60Q 1/48* (2006.01)

(52) U.S. Cl.
USPC .......................... 340/932.2; 340/933; 340/937

(58) Field of Classification Search
USPC .................. 340/932.2, 933, 937; 705/13, 418
See application file for complete search history.

(56) References Cited

U.S. PATENT DOCUMENTS

| | | | | |
|---|---|---|---|---|
| 7,714,742 | B1 | 5/2010 | Noworolski et al. | |
| 7,825,827 | B2 * | 11/2010 | Jang et al. | 340/932.2 |
| 7,893,848 | B2 * | 2/2011 | Chew | 340/932.2 |
| 2008/0165030 | A1 * | 7/2008 | Kuo et al. | 340/932.2 |
| 2009/0138345 | A1 * | 5/2009 | Dawson et al. | 705/13 |
| 2011/0276370 | A1 * | 11/2011 | Agrait et al. | 705/13 |
| 2012/0284146 | A1 * | 11/2012 | Wong | 705/26.41 |

OTHER PUBLICATIONS

U.S. Appl. No. 61/757,627, Zhang.

* cited by examiner

*Primary Examiner* — Toan N Pham

(57) ABSTRACT

The present invention discloses an improved large-area parking-monitoring system. It comprises first and second parking-monitoring devices. The first parking-monitoring device transmits its parking occupancy data to the second parking-monitoring device via WiFi signals. The second parking-monitoring device transmits the collected parking occupancy data to a base station via cellular signals. This parking-monitoring system has a reduced cellular usage.

10 Claims, 7 Drawing Sheets

LARGE-AREA PARKING-MONITORING SYSTEM

CROSS-REFERENCE TO RELATED APPLICATIONS

This application claims priority of a provisional application entitled "Improved Large-Area Parking Monitoring System", Ser. No. 61/758,752, filed Jan. 30, 2013.

BACKGROUND

1. Technical Field of the Invention

The present invention relates to the field of electronics, and more particularly, to an improved large-area parking-monitoring system, e.g. a city-wide parking-monitoring system.

2. Prior Arts

Locating a vacant parking space causes much frustration to motorists. It increases fuel consumption and has a negative impact to the environment. To conserve energy resources and enhance the quality of the environment, it is highly desired to develop a parking-monitoring system, which can transmit substantially real-time parking occupancy data to motorists. Based on the parking occupancy data, a motorist can be guided towards a vacant parking space at destination.

Many parking-monitoring systems disclosed in prior arts are designed for a small parking area (e.g. a parking lot or few city blocks), not for a city spanning a few square kilometers. To monitor parking city-wide, U.S. Patent Application 61/757,627 filed by Zhang on Jan. 28, 2013 discloses a large-area parking-monitoring system. This system comprises a plurality of parking-monitoring devices. Each device monitors a large number of parking spaces and transmits parking occupancy data through a cellular network. This data transmission is characterized by a small amount of data per transmission (e.g. as little as a few bytes) and long intervals (e.g. one transmission every minute). Considering that a city-wide parking-monitoring system comprises hundreds to thousands of parking-monitoring devices, if all of them transmit parking occupancy data with the above characteristics through the cellular network, a lot of cellular resource will be wasted.

OBJECTS AND ADVANTAGES

It is a principle object of the present invention to conserve energy resources and enhance the quality of the environment.

It is a further object of the present invention to provide a city-wide parking-monitoring system with reduced cellular usage.

It is a further object of the present invention to provide a city-wide parking-monitoring system at low cost.

It is a further object of the present invention to reduce stress and save time for motorists.

In accordance with these and other objects of the present invention, an improved large-area parking-monitoring system is disclosed.

SUMMARY OF THE INVENTION

The present invention discloses an improved large-area parking-monitoring system. It comprises a plurality of parking-monitoring devices. Each device monitors a large number of parking spaces simultaneously and generates parking occupancy data at pre-determined times. The parking-monitoring devices are categorized into satellite devices and collection devices: the satellite devices transmit their parking occupancy data to a collection device via medium-range wireless (e.g. WiFi) signals, and the collection device collects parking occupancy data from a plurality of collection devices and then transmits the collected parking occupancy data to a base station via long-range wireless (e.g. cellular) signals. Because fewer devices transmit parking occupancy data via cellular signals, the present invention has a reduced cellular usage.

Figure 1:
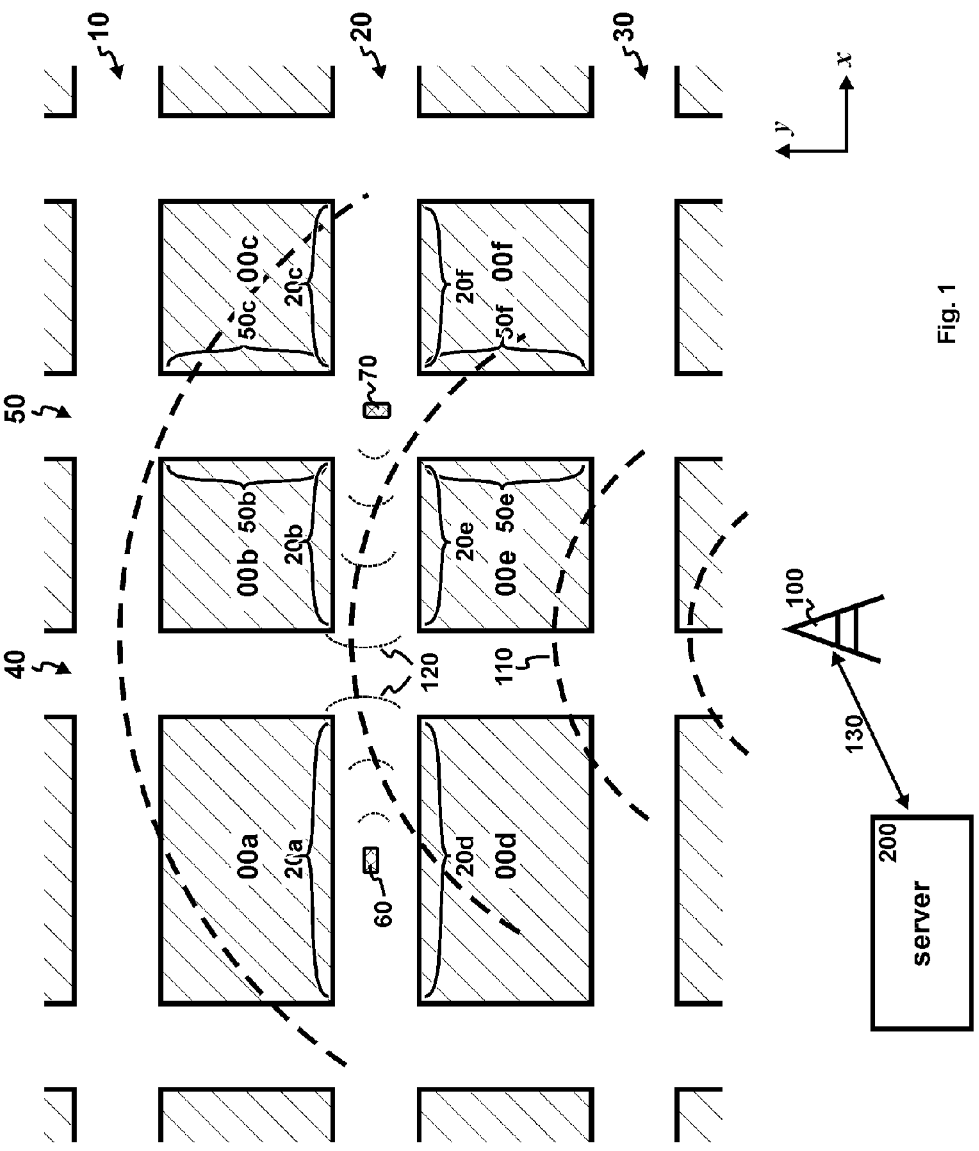
FIG. 1 illustrates an improved large-area parking-monitoring system deployed in several city blocks.

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

Referring now to FIG. 1, an improved large-area parking-monitoring system deployed in several city blocks 00*a*-00*f* is disclosed. These city blocks 00*a*-00*f* are defined by x-streets (i.e. streets oriented along the x direction) 10, 20, 30 and y-street (i.e. streets oriented along the y direction) 40, 50. Vehicles can be parked along curbs, e.g. along the curb 20*a* of the street 20 within the block 00*a*. The preferred large-area parking-monitoring system comprises a plurality of parking-monitoring devices 60, 70 . . . . In this example, device 60 monitors parking occupancy along two curbs 20*a*, 20*d* of two blocks 00*a*, 00*d*, while device 70 monitors parking occupancy along eight curbs (20*b*, 20*c*, 20*e*, 20*f*, 50*b*, 50*c*, 50*e*, 50*f*) of four smaller blocks (00*b*, 00*c*, 00*e*, 00*f*).

While monitoring parking, each parking-monitoring device generates parking occupancy data at pre-determined times. The parking occupancy data from the device 60 are first transmitted to the device 70 via WiFi signals 120. Then the parking occupancy data from the devices 60 and 70 are collectively transmitted to a base station 100 via cellular signals 110. The base station 100 further transmits these data to a parking-management server 200 via an internet connection 130. The internet connection 130 uses wired land lines such as optical fibers. Alternatively, the internet connection 130 uses microwave or other means.

The parking-management server 200 manages parking occupancy data. To be more specific, it collects parking occupancy data transmitted from various parking-monitoring devices and compiles these data into a parking occupancy data-base. This data-base stores parking occupancy data for at least a portion of a city and can be integrated with an electronic map. For example, the parking occupancy data can be displayed on Google map. When a motorist needs guidance to a vacant parking space at destination, he may retrieve the corresponding parking occupancy data. The retrieved parking occupancy data may be displayed on a personal computer (PC) and/or a portable device. The portable device could be a vehicle-mounted device or a hand-held device (e.g. a PDA, a smart-phone or a tablet). The portable device may also produce visual and/or audible instructions to the motorist to the selected vacant parking space.

Figure 2A:
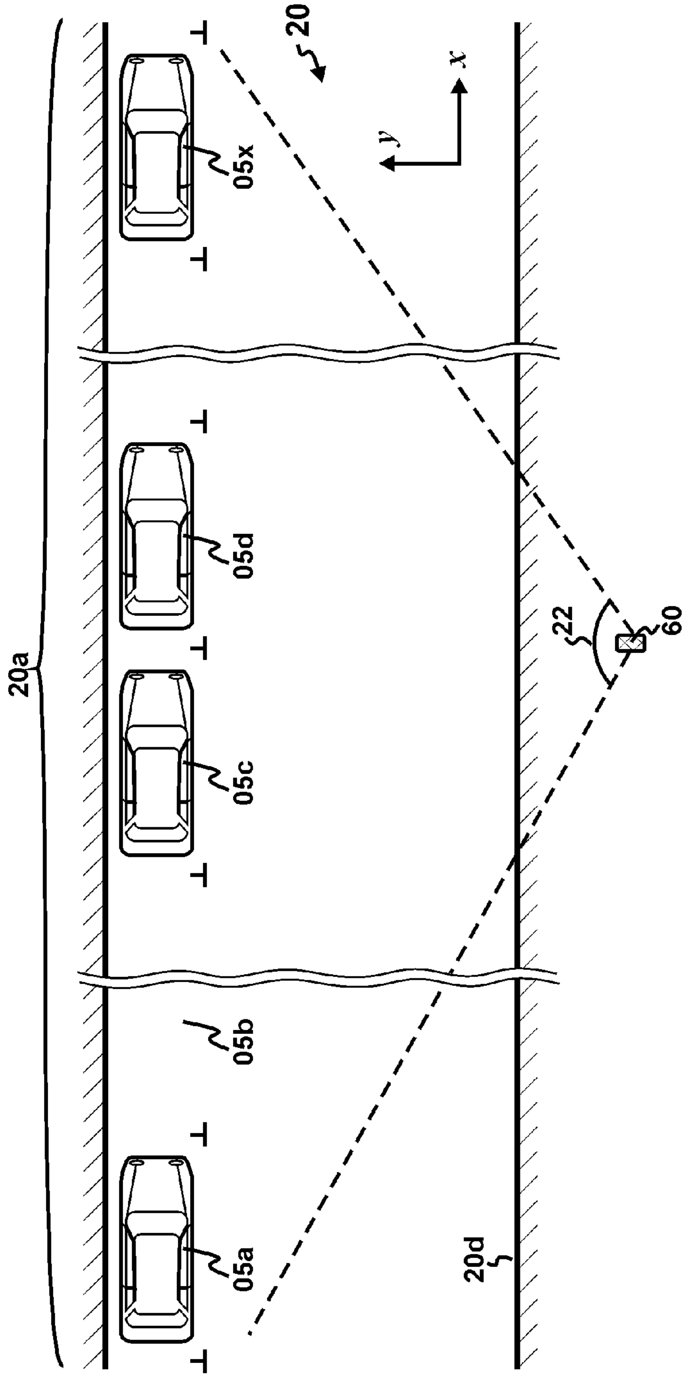
FIGS. 2A-2B illustrate the placement of a preferred parking-monitoring device.
Figure 2B:
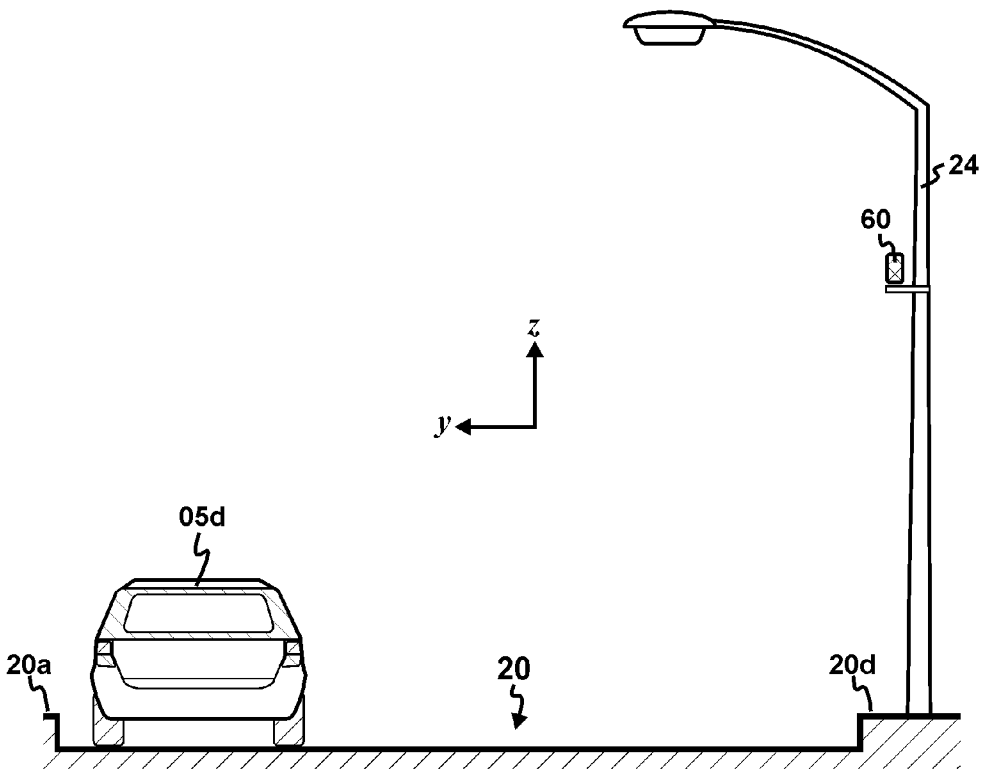

FIGS. 2A-2B illustrate the placement of a preferred parking-monitoring device 60. The preferred parking-monitoring device 60 monitors a large number of parking spaces (e.g. ~20-80 parking spaces) simultaneously. FIG. 2A is the top view of a curb 20*a* along an x-street 20. There are a plurality of parking spaces 05*a*, 05*b* . . . 05*x* along the curb 20*a*. The parking-monitoring device 60 is placed on the opposite curb 20*d* of the street 20 in such a way that the viewing angle 22 of its camera covers as many parking spaces as possible. FIG. 2B is a cross-sectional view of the street 20. The parking-monitoring device 60 is mounted on a support 24 such as an utility pole or a street-lamp post. The support 24 generally can provide power to the device 60. The device 60 is typically mounted at a position higher than the top of the vehicles parked in the street 20. This arrangement makes it easier for the image-recognition app to differentiate between occupied and vacant parking spaces.

Figure 3:
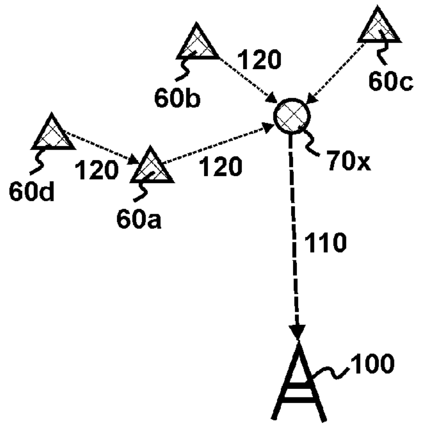
FIG. 3 illustrates an architecture of a preferred parking-monitoring system.

Referring now to FIG. 3, architecture of a preferred parking-monitoring system is disclosed. It comprises a plurality of parking-monitoring devices 60*a*-60*d*, 70*x* . . . . Each device monitors a large number of parking spaces and generates the corresponding parking occupancy data at pre-determined times. The parking occupancy data could just be a list of binary numbers arranged in a pre-defined order. Each binary number represents occupancy or vacancy of a parking space. For example, a binary "0" represents an occupied parking space and a binary "1" represents a vacant parking space.

When using cameras to monitor parking, the parking-monitoring devices are generally spaced at ~50-100 meters. At this distance, these devices can easily communicate with each other via WiFi signals 120. Accordingly, the parking-monitoring devices 60*a*-60*d*, 70*x* can form a WiFi network. Within this network, the parking-monitoring devices can be categorized into satellite device (e.g. 60*a*-60*d*) and collection device (e.g. 70*x*). The satellite devices 60*a*-60*d* transmit their parking occupancy data to the collection device 70*x* via WiFi signals. This data transmission could be either direct or indirect. For example, the satellite device 60*b* directly transmits its parking occupancy data to the collection device 70*x*, while the satellite device 60*d* indirectly transmits its parking occupancy data to the collection device 70*x*, i.e. through another satellite device 60*a*. In this case, the satellite device 60*d* is the up-stream device for the satellite device 60*a*, while the satellite device 60*a* is the down-stream device for the satellite device 60*d*.

The collection device 70*x* collects parking occupancy data from various satellite devices 60*a*-60*d* within the WiFi network and transmits the collected parking occupancy data to a base station 100 via cellular signals 110. Even though a typical WiFi network covers a few hundred parking spaces, the collected parking occupancy data contains a small amount of data, e.g. as little as a few hundred bits, because each parking space needs only one bit. Since only the collection devices transmitting data via cellular signals 110, the present invention has a reduced cellular usage. Note that, when these parking-monitoring devices 60*a*-60*d*, 70*x* are used as security cameras, the WiFi network can be used to transmit the desired images of the monitored parking spaces to the collection device 70*x*, which will then transmit the received images to a security server via cellular signals 110.

Figure 4A:
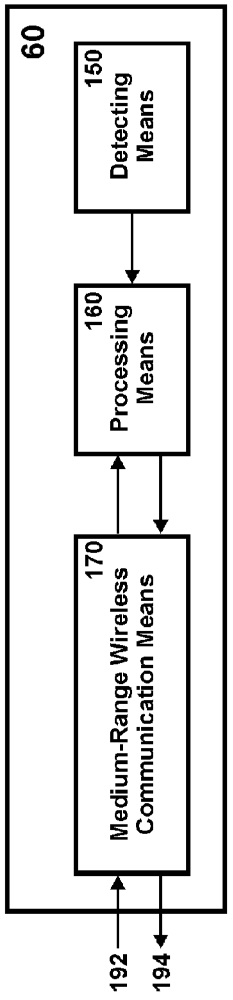
FIG. 4A is a block diagram of a preferred parking-monitoring satellite device.

FIG. 4A is a block diagram of a preferred parking-monitoring satellite device 60. It comprises a detecting means 150, a processing means 160 and a medium-range wireless communication means 170. The detecting means 150 monitors a large number of parking spaces. Based on the inputs from the detecting means, the processing means 160 generates local parking occupancy data, i.e. the parking occupancy data for the parking spaces monitored by the device 60. Using the medium-range wireless communication means 170, the satellite device 60 transmits its local parking occupancy data 194 to the downstream device(s) (e.g. a collection device 70). Alternatively, the satellite device 60 receives upstream parking occupancy data 192, i.e. parking occupancy data for the parking spaces monitored by the upstream device(s), combines them with its local parking occupancy data and transmits the combined parking occupancy data 194 to the downstream device(s) using the medium-range wireless communication means 170.

Figure 4B:
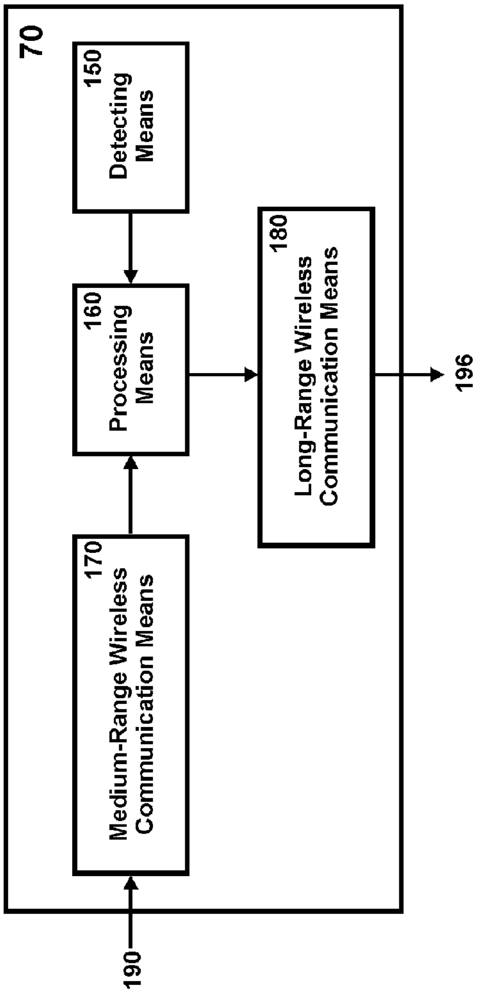
FIG. 4B is a block diagram of a preferred parking-monitoring collection device.

FIG. 4B is a block diagram of a preferred parking-monitoring collection device 70. It comprises a detecting means 150, a processing means 160, a medium-range wireless communication means 170 and a long-range wireless communication means 180. Different from that of FIG. 4A, the upstream parking occupancy data 190 are combined with the local parking occupancy data to form the collected parking occupancy data 196, which are transmitted to the base station 100 via the long-range wireless communication means 180. Alternatively, the collection device 70 does not comprise the detecting means 150 and the processing means 160. Namely, it does not generate local parking occupancy data and only transmits the parking occupancy data collected from the upstream devices to the base station 100.

Figure 5A:
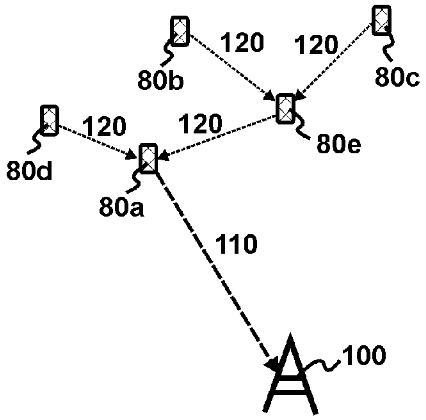
FIGS. 5A-5B illustrates two preferred re-configurable parking-monitoring systems.
Figure 5B:
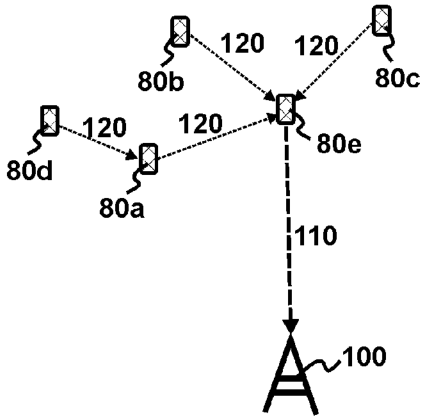

In the preferred parking-monitoring system of FIG. 3, the roles of the satellite devices 60*a*-60*d* and the collection device 70*x* are fixed. Any failure of the collection device 70*x* could be disastrous to the whole system. To improve the system reliability, the present invention further discloses a re-configurable parking-monitoring system. It comprises at least one wireless mesh network. Each wireless mesh network comprises a plurality of re-configurable parking-monitoring devices, i.e. the role of each device could be re-configured. For example, a device could be either in satellite mode or in collection mode. As a result, the re-configurable parking-monitoring system has a self-healing capability. FIGS. 5A-5B disclose two examples.

In the wireless mesh network of FIG. 5A, the device 80*a* is in collection mode (i.e. collection device) and all other devices 80*b*-80*e* are in satellite mode (i.e. satellite devices). The satellite devices 80*b*-80*e* transmit their parking occupancy data to the collection device 80*a* via WiFi signals 120. The collection device 80*a* then transmits the collected parking occupancy data to the base station 100 via cellular signals 110. After re-configuring the mesh network from that of FIG. 5A to that of FIG. 5B, the device 80*e* is in collection mode and all other devices 8*a*-80*d* are in satellite mode. The satellite devices 80$a$-80$d$ transmit their parking occupancy data to the collection device 80$e$ via WiFi signals 120. The collection device 80$e$ then transmits the collected parking occupancy data to the base station 100 via cellular signals 110.

Figure 6:
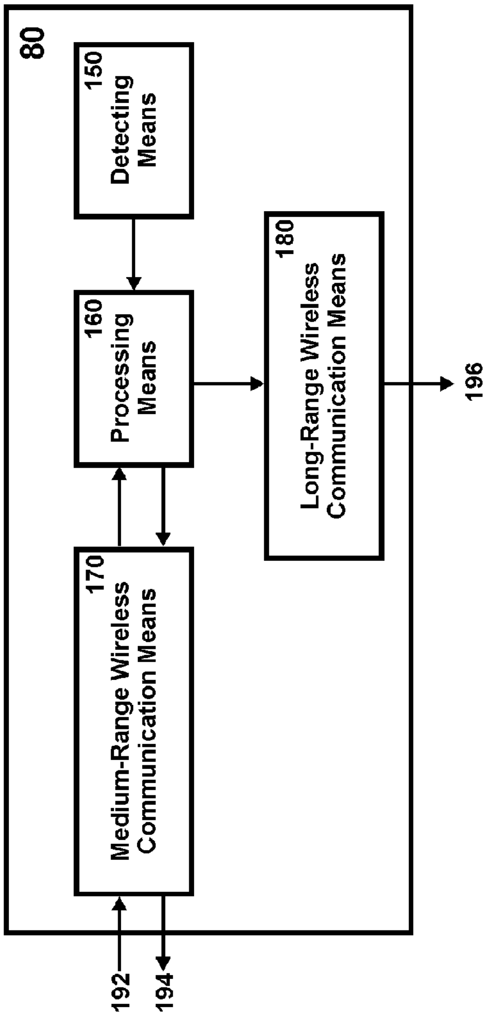
FIG. 6 is a block diagram of a preferred re-configurable parking-monitoring device.

FIG. 6 is a block diagram of a preferred re-configurable parking-monitoring device 80. It comprises a detecting means 150, a processing means 160, a medium-range wireless (e.g. WiFi) communication means 170 and a long-range wireless (i.e. cellular) communication means 180. When used as a satellite device, the long-range wireless communication means 180 is disabled. On the other hand, when used as a collection device, both the medium- and long-range wireless communication means 170, 180 are enabled.

Figure 7B:
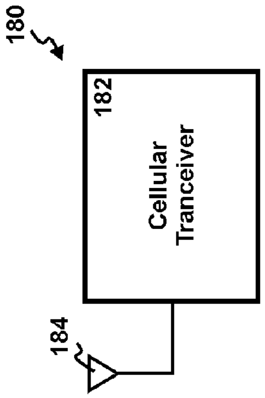
FIG. 7B is a block diagram of a preferred long-range wireless communication means.
Figure 7A:
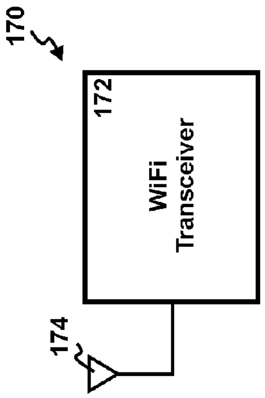
FIG. 7A is a block diagram of a preferred medium-range wireless communication means.

In the present invention, the medium-range wireless communication means generally has a range less than one hundred meters. In most cases, it uses WiFi technology. FIG. 7A discloses an example. This preferred medium-range wireless communication means 170 comprises a WiFi transceiver 172 and a WiFi antenna 174. Because the parking-monitoring devices communicate with each other in a peer-to-peer manner, the ad-hoc WiFi communication is preferably used.

In the present invention, the long-range wireless communication means generally has a range greater than one hundred meters, preferably greater than one kilometer. In most cases, it uses cellular technology. FIG. 7B discloses an example. This preferred long-range wireless communication means comprises a cellular transceiver 182 and a cellular antenna 184. The cellular communication means could use 2G (e.g. GSM . . . ), 2.5G (e.g. GPRS . . . ), 3G (e.g. UMTS, CDMA2000 . . . ), 4G (e.g. LTE, Mobile WiMAX . . . ) and/or other cellular technologies. It may also use personal handy-phone system (PHS). PHS is also referred to as personal access system (PAS) and is widely used in Asian countries.

In FIGS. 4A-4B and FIG. 6, the detecting means 150 could comprise at least one camera. When the detecting means 150 comprises a plurality of cameras, these cameras may face different directions in such a way that a large number of parking spaces can be monitored simultaneously. The processing means 160 could comprise a processor and a memory. The processor could be any type of central-processing unit (CPU) and/or digital signal processor (DSP). The memory used by the parking-monitoring device (not shown in these figures) could be any type of non-volatile memory (NVM, e.g. flash memory) or hard-disk drive (HDD). It could store an operating system of the parking-monitoring device. This operating system is preferably a smart-phone operating system, e.g. iOS, Android. It could further store an image-recognition app and its configuration file. In the case that the parking monitor device is used as a security camera, the memory can be used to store the captured videos for a predetermined period of time. These videos can be transmitted to a server with the wireless communication means 170, 180. To minimize cabling cost, the detecting means 150, the processing means 160, the medium-range communication means 170 and the long-range communication means 180 are physically located in close proximity to each other. In one example, they are located in a single housing.

Figure 8:
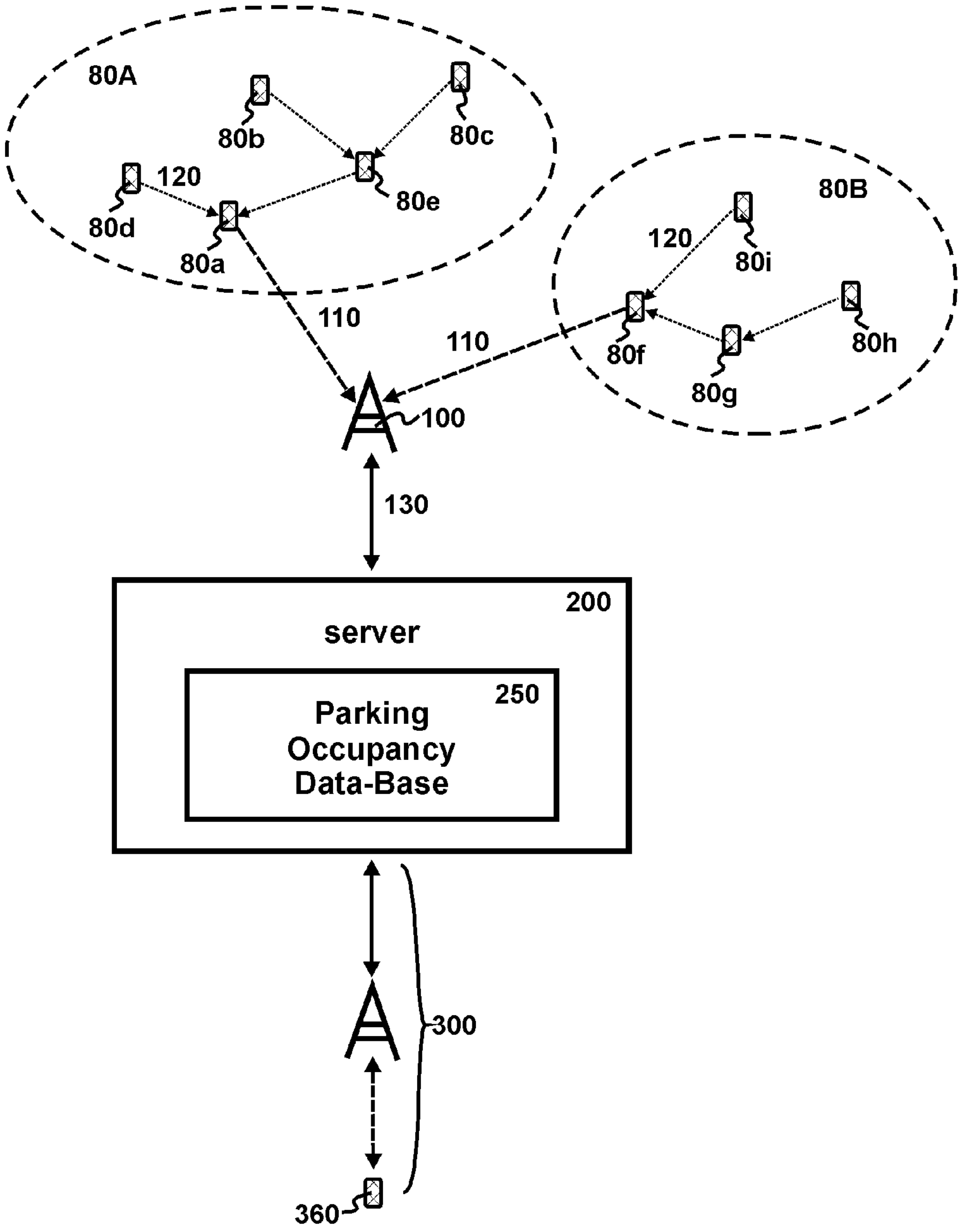
FIG. 8 illustrates a preferred smart-phone-based parking-monitoring and guidance system.

Considering almost every smart-phone has WiFi and cellular communication capabilities, the present invention discloses a smart-phone-based parking-monitoring and guidance system. As illustrated in FIG. 8, this system comprises a plurality of parking-monitoring smart-phones (or, smart-phone-like devices) 80$a$-80$i$, a parking-management server 200 and at least one parking-guidance smart-phone 360.

The parking-monitoring smart-phones 80$a$-80$i$ run an image-recognition app and are deployed city-wide to monitor parking. To lower the device cost, bare-bone smart-phones (e.g. smart-phones without keypad or screen) may be used. The parking-monitoring smart-phones 80$a$-80$i$ form at least two WiFi mesh networks 80A, 80B. Each mesh network (e.g. 80A) comprises at least one collection device (e.g. 80$a$) and a plurality of satellite device (e.g. 80$b$-80$e$). The satellite devices 80$b$-80$e$ transmit their parking occupancy data to the collection device 80$a$ via WiFi signals. The collection device 80$a$ transmits the collected parking occupancy data to a base station 100 via cellular signals 110. The base station 100 further transmits these data to a parking-management server 200 via an internet connection 130. The parking-management server 200 collects parking occupancy data from various mesh networks 80A, 80B and compiles them into a parking occupancy data-base 250. This data-base can be integrated into an electronic map (e.g. Google map).

The parking-guidance smart-phone 360 is carried by a motorist. When the motorist needs guidance to a vacant parking space at destination, the parking-guidance smart-phone 360 retrieves the corresponding parking occupancy data from the parking-management server 200 via cellular signals 300, and then displays visual guidance and/or produces audible instruction to the motorist to the selected vacant parking space.

While illustrative embodiments have been shown and described, it would be apparent to those skilled in the art that may more modifications than that have been mentioned above are possible without departing from the inventive concepts set forth therein. For example, besides curb-side parking, the preferred large-area parking-monitoring system can be used to monitor a parking lot. The invention, therefore, is not to be limited except in the spirit of the appended claims.

What is claimed is:

1. A large-area parking-monitoring system comprising a plurality of externally-powered re-configurable parking-monitoring devices including first and second monitoring devices, each of said monitoring devices comprising:

- a detector for generating parking occupancy data for a plurality of parking spaces;
- a medium-range wireless communication module for transmitting said parking occupancy data between selected ones of said parking-monitoring devices; and
- a long-range wireless communication module for transmitting collected parking occupancy data to a base station;

wherein:

- said first monitoring device receives parking occupancy data from said second monitoring device via medium-range wireless communication signals and transmits collected parking occupancy data to said base station via long-range wireless communication signals in a first configuration;
- said second monitoring device receives parking occupancy data from said first monitoring device via medium-range wireless communication signals and transmits collected parking occupancy data to said base station via long-range wireless communication signals in a second configuration.

2. The large-area parking-monitoring system according to claim 1, wherein the long-range wireless communication module of said second monitoring device is disabled in said first configuration.

3. The large-area parking-monitoring system according to claim 1, wherein the long-range wireless communication module of said first monitoring device is disabled in said second configuration.

4. The large-area parking-monitoring system according to claim 1, wherein said medium-range wireless communication module is a WiFi communication module.

5. The large-area parking-monitoring system according to claim 1, wherein said long-range wireless communication module is a cellular communication module.

6. The large-area parking-monitoring system according to claim 1, wherein selected one of said parking-monitoring devices is mounted on a support.

7. The large-area parking-monitoring system according to claim 6, wherein said support provides power to said selected one of said parking-monitoring devices.

8. The large-area parking-monitoring system according to claim 1, wherein said parking-monitoring devices are smart-phone-like devices.

9. The large-area parking-monitoring system according to claim 8, wherein said parking-monitoring devices use a smart-phone operating system.

10. The large-area parking-monitoring system according to claim 8, wherein said parking-monitoring devices run an image-recognition app.

* * * * *